US006989970B2

(12) United States Patent
Nguyen et al.

(10) Patent No.: US 6,989,970 B2
(45) Date of Patent: Jan. 24, 2006

(54) ROTARY ACTUATOR ASSEMBLY FOR A ROTATABLE MEDIA DATA STORAGE DEVICE (75) Inventors: Christopher Nguyen, Union City, CA (US); Joseph T. Castagna, San Jose, CA (US); Richard G. Ramsdell, Saratoga, CA (US)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 146 days.

(21) Appl. No.: 10/365,932

(22) Filed: Feb. 13, 2003

(65) Prior Publication Data
US 2004/0125505 A1 Jul. 1, 2004

Related U.S. Application Data (60) Provisional application No. 60/436,741, filed on Dec. 27, 2002.

(51) Int. Cl.
G11B 21/08 (2006.01)

(52) U.S. Cl. .................................. 360/265.7
(58) Field of Classification Search ............ 360/265.7, 360/244.5, 244–6, 265.9, 99.08; 29/603.03
See application file for complete search history.

(56) References Cited

U.S. PATENT DOCUMENTS

| 4,860,135 A | | 8/1989 | Cain ....................... 360/97.02 |
| 4,912,583 A | * | 3/1990 | Hinlein .................... 360/244.5 |
| 4,942,491 A | | 7/1990 | Osawa et al. ............. 360/265.9 |
| 4,994,931 A | | 2/1991 | Foote ........................ 365/106 |
| 5,034,837 A | | 7/1991 | Schmitz |
| 5,040,086 A | | 8/1991 | Hibino ..................... 360/264.1 |
| 5,099,373 A | | 3/1992 | Shibata et al. ........... 360/265.9 |
| 5,109,310 A | | 4/1992 | Ohkjita et al. ........... 360/264.3 |
| 5,119,537 A | | 6/1992 | Hamanaka et al. ...... 29/603.03 |
| 5,184,265 A | * | 2/1993 | Foote et al. ............. 360/265.9 |
| 5,235,482 A | | 8/1993 | Schmitz ................... 360/97.02 |
| 5,382,851 A | | 1/1995 | Loubier ...................... 310/13 |

(Continued)

FOREIGN PATENT DOCUMENTS

FR 744482 A2 * 11/1996

(Continued)

OTHER PUBLICATIONS

"A novel suspension arm with 2-dimensional actuation, for flying height control and high-bandwidth track following in advanced hard disk drives"; Chilumbu, C.; Clegg, W.; Jenkins, D.; Robinson, P.; May 1-4, 2000; pp.: 562-566.

Primary Examiner—Allen Cao
(74) Attorney, Agent, or Firm—Fliesler Meyer LLP (57) ABSTRACT Assemblies in accordance with the present invention can access a data storage medium having one or more disks. One such assembly comprises a mounting block including a bore and at least one arm connected with the mounting block. A flexible member is connected with the at least one arm and a head is associated with the flexible member. The head is positioned over the surface of the disk. The arm is designed such that it can be disconnected from the mount without disassembling the bore. By having a removably fastened arm, the assembly can be built at a relatively low cost and without misalignment and deformation. This description is not intended to be a complete description of, or limit the scope of, the invention. Other features, aspects, and objects of the invention can be obtained from a review of the specification, the figures, and the claims.

7 Claims, 5 Drawing Sheets

U.S. PATENT DOCUMENTS

| | | | |
|---|---|---|---|
| 5,404,636 A | 4/1995 | Stefansky et al. | 29/603 |
| 5,491,598 A | 2/1996 | Stricklin | |
| 5,495,375 A | 2/1996 | Baasch et al. | 360/266.1 |
| 5,508,860 A * | 4/1996 | Takagi et al. | 360/97.01 |
| 5,535,074 A * | 7/1996 | Leung | 360/265.9 |
| 5,627,702 A | 5/1997 | Kelemen | |
| 5,646,802 A * | 7/1997 | Akiyama et al. | 360/244.6 |
| 5,691,581 A | 11/1997 | Umehara et al. | 310/13 |
| 5,731,934 A | 3/1998 | Brooks et al. | 360/266.1 |
| 5,751,519 A | 5/1998 | Hata | |
| 5,862,019 A | 1/1999 | Larson | 360/265.8 |
| 5,875,072 A | 2/1999 | Brooks, Jr. et al. | |
| 5,877,919 A * | 3/1999 | Foisy et al. | 360/244.6 |
| 5,986,852 A * | 11/1999 | Berg et al. | 360/265.9 |
| 6,128,164 A * | 10/2000 | Kant et al. | 360/244.5 |
| 6,166,886 A | 12/2000 | Toensing | 360/244.5 |
| 6,185,075 B1 | 2/2001 | Tsujino | |
| 6,230,959 B1 * | 5/2001 | Heist et al. | 228/155 |
| 6,256,173 B1 | 7/2001 | Chee | |
| 6,446,325 B1 * | 9/2002 | Prater | 29/603.03 |
| 6,469,872 B1 * | 10/2002 | Kant et al. | 360/265.7 |
| 6,525,910 B1 | 2/2003 | Macpherson | |
| 6,725,526 B2 | 4/2004 | Lille | 29/603.1 |
| 6,836,387 B2 * | 12/2004 | Ohba et al. | 360/97.01 |
| 2002/0064000 A1 * | 5/2002 | Liu et al. | 360/265.9 |

FOREIGN PATENT DOCUMENTS

| | | |
|---|---|---|
| GB | 2170345 | 7/1986 |
| JP | 04276364 A | 10/1992 |

* cited by examiner

ROTARY ACTUATOR ASSEMBLY FOR A ROTATABLE MEDIA DATA STORAGE DEVICE

PRIORITY CLAIM

This application claims priority to the following U.S. Provisional Patent Applications.

U.S. Provisional Patent Application No. 60/436,741, entitled "Rotary Actuator Assembly for a rotatable Media Data Storage Device," filed Dec. 27, 2002.

CROSS-REFERENCED CASES

U.S. patent application Ser. No. 10/366,235, entitled "Methods for Assembling or Reworking a Rotary Actuator Assembly for a Rotatable Media Data Storage Device," filed herewith.

U.S. patent application Ser. No. 10/366,074, entitled "Modular Rotary Actuator Assembly for a Rotatable Media Data Storage Device," filed herewith.

U.S. patent application Ser. No. 10/365,934, entitled "Methods for Assembling or Reworking a Modular Rotary Actuator Assembly for a Rotatable Media Data Storage Device," filed herewith.

U.S. patent application Ser. No. 10/365,912, entitled "Removable Bearing Assembly for a Rotary Actuator Assembly in a Rotatable Media Data Storage Device," filed herewith.

U.S. patent application Ser. No. 10/365,906, entitled "Methods for Seating a Removable Bearing Assembly in a Rotary Actuator Assembly for a Rotatable Media Data Storage Device," filed herewith.

U.S. patent application Ser. No. 10/366,237, entitled "Intermediate Power Down Mode for a Rotatable Media Data Storage Device," filed herewith.

FIELD OF THE INVENTION

The present invention relates generally to rotatable media data storage devices, as for example magnetic or optical hard disk drive technology, and more specifically to actuator assemblies for positioning heads in hard disk drives.

BACKGROUND OF THE INVENTION

Computer systems are fundamentally comprised of subsystems for storing and retrieving information, manipulating information, and displaying information. Nearly all computer systems today use optical, magnetic or magneto-optical storage media to store and retrieve the bulk of a computer system's data. Successive generations of ever more powerful microprocessors, and increasingly complex software applications that take advantage of these microprocessors, have driven the storage capacity needs of systems higher and have simultaneously driven read and write performance demands higher. Magnetic storage remains one of the few viable technologies for economically storing large amounts of information with acceptable read and write performance.

Market pressures place ever greater demands on hard disk drive manufacturers to reduce drive costs. In order to maintain market advantage, new hard disk drive designs typically incorporate greater efficiency in device operating tolerances or manufacturability.

There are basic components common to nearly all hard disk drives. A hard disk drive typically contains one or more disks clamped to a rotating spindle, a head for reading or writing information to the surface of each disk, and an actuator assembly utilizing linear or rotary motion for positioning the head for retrieving particular information or writing information to a particular location on the disk. A rotary actuator is a complex assembly that couples the head to a pivot point that sweeps the head across the surface of the rotating disk. The assembly typically couples the head to a flexible member called a suspension, which is then coupled to the pivotally mounted actuator assembly.

The current state of the art is to use one of two basic designs for attaching the suspensions with the actuator assembly: (1) the one-piece E-shaped block assembly (generally referred to as an E-block) or (2) the multi-piece assembly with unitary mounted suspension (generally referred to as Unamount). The E-block, typically made of aluminum or magnesium, is cast or extruded as a singular block element and machined to provide attachment points for suspensions (the attachment points form rigid arms). One or two suspensions are connected with each arm by swaging or staking through a machined bore in the arm which is aligned with a bore in the suspension. Swaging uses steel balls slightly larger in diameter than the machined bores to apply axial forces which deform and attach the suspensions to the arms.

Swaging applies force to the suspension and can deform a cantilevered portion of the suspension used to hold a slider on which a head is mounted. Deformation of the cantilevered portion of the suspension can lead to structural resonance variation and reduction in the reliability of ramp-based head loading and unloading. In order to control the amount of deforming force applied to the suspension with each impact, multiple steel balls with increasing diameters are often used in the swaging process. Damage can still result to the suspension. As data storage tracks are packed more tightly and as actuator arm block sizes shrink, requiring more precise performance of the actuator assembly, this problem will likely become acute, impacting future manufacturing yields. Further, it is difficult to maintain the preset spring rate and gram load of the suspensions during the swaging process, and suspension alignment and staking must be supervised and monitored, increasing the cost and decreasing the speed of assembly of the drives.

The Unamount assembly uses an actuator arm plate, typically stamped from a thin stainless steel sheet, that includes a circular bore that when coupled to spacer elements, forms a cylindrical bore designed to receive a bearing assembly. Each suspension is micro-spot welded to each actuator arm plate, which is then secured to the spacers and other such arm assemblies in a rigid manner to form the actuator assembly. The Unamount assembly has significant disadvantages including higher assembly cost, difficult assembly cleaning, potential for component damage during rework (the rigid assembly must be unfastened and the bearing assembly removed or exposed to detach a single arm plate), and less design flexibility due to the difficulty of structurally tuning the arm and suspension resonances at the same time.

BRIEF DESCRIPTION OF THE FIGURES

Further details of embodiments of the present invention are explained with the help of the attached drawings in which.

DETAILED DESCRIPTION

Figure 1A:
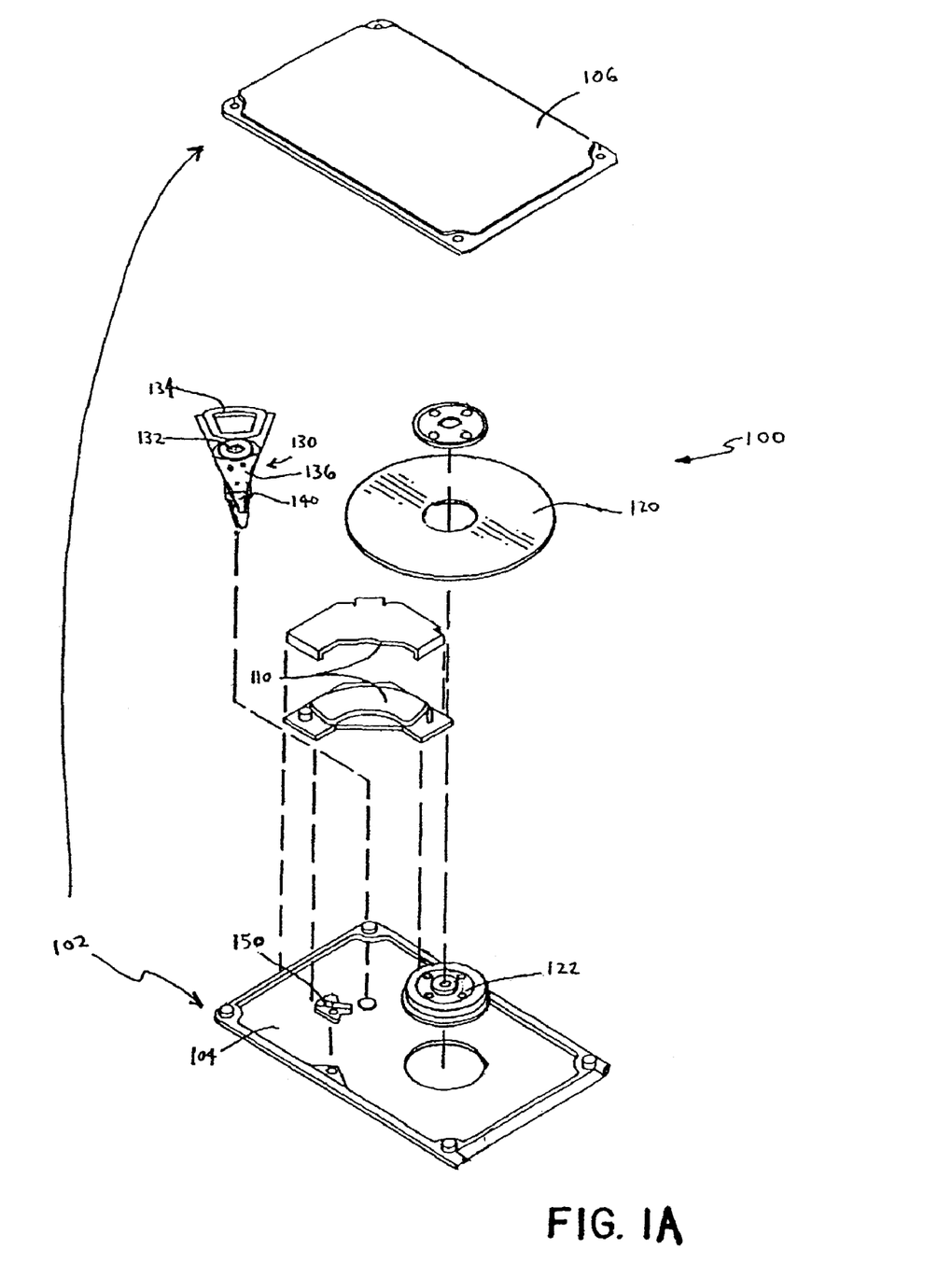
FIG. 1A is an exploded view of a typical hard disk drive utilizing an actuator assembly in accordance with one embodiment of the present invention.

FIG. 1A is an exploded view of a hard disk drive 100 utilizing an actuator assembly in accordance with one embodiment of the present invention. The hard disk drive 100 has a housing 102 which is formed by a housing base 104 and a housing cover 106. A single disk 120 is attached to the hub of the spindle motor 122, with the spindle motor 122 mounted to the housing base 104. The disk 120 can be made of a light aluminum alloy, ceramic/glass or other suitable substrate, with magnetic material deposited on one or both sides of the disk 120. The magnetic layer has tiny domains of magnetization for storing data transferred through heads. The invention described herein is equally applicable to technologies using other media, as for example, optical media. Further, the invention described herein is equally applicable to devices having any number of disks attached to the hub of the spindle motor. The disks are connected to a rotating spindle 122 (for example by clamping), spaced apart to allow heads to access the surfaces of each disk, and rotated in unison at a constant or varying rate typically ranging from less than 3,600 RPM to over 15,000 RPM (speeds of 4,200 and 5,400 RPM are common in hard disk drives designed for mobile devices such as laptops).

Figure 1B:
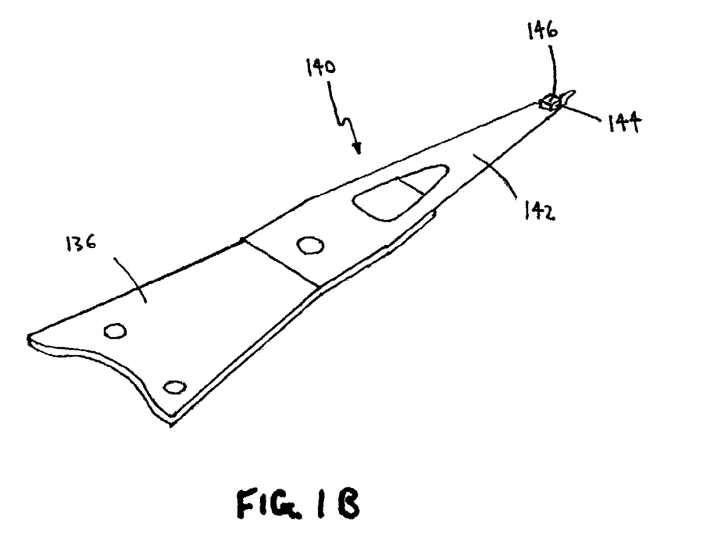
FIG. 1B is a close-up view of a head suspension assembly used in the hard disk drive of FIG. 1A, showing head, slider and suspension.
Figure 1C:
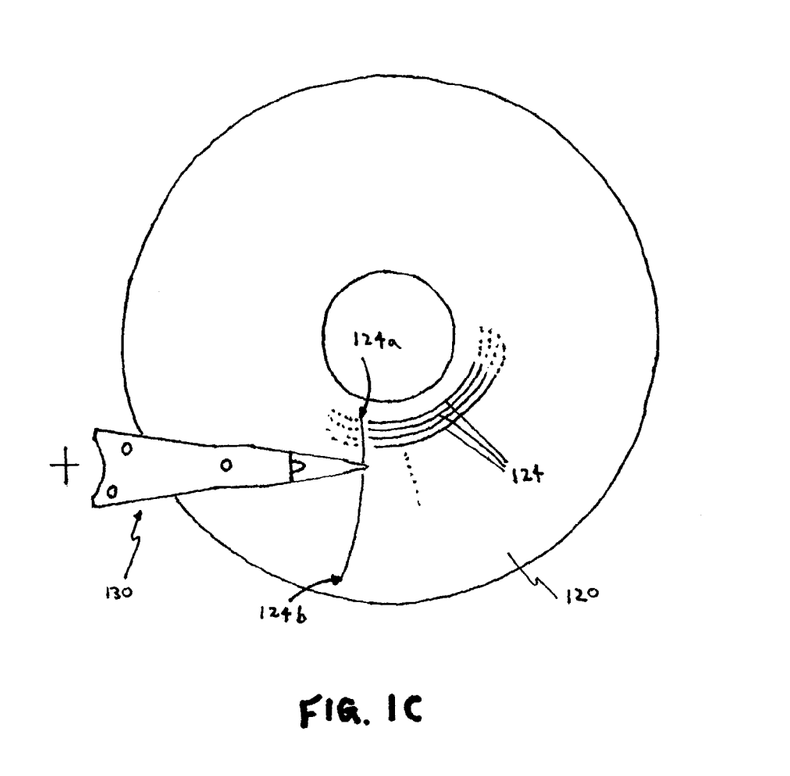
FIG. 1C is an illustration of the rotary motion of a head suspension assembly of FIG. 1B across the surface of a disk.

The actuator assembly 130 is pivotally mounted to the housing base 104 by a bearing assembly 132 and sweeps an arc, as shown in FIG. 1C, between at least an inner actuator addressable diameter of the disk 124a and an outer actuator addressable diameter of the disk 124b. Attached to the housing 104 are upper and lower magnet return plates 110 and at least one magnet that together form the stationary portion of the voice coil motor assembly 112. The voice coil 134 is mounted to the actuator assembly 130 and positioned in the air gap of the voice coil motor 112 which applies a force to the actuator assembly 130 to provide the pivoting motion about the bearing assembly 132. The voice coil motor allows for precise positioning of the heads 146 along the surface of the disk 120. The voice coil motor 112 is coupled with a servo system (not shown) to accurately position the head 146 over a specific track on the disk 120. The servo system acts as a guidance system, using positioning code (for example grey code) read by the head 146 from the disk 120 to determine the position of the head 146 on tracks 124 on the disk 120. The actuator assembly 130 is shown in FIG. 1B to have an overall wedge-shape, but could alternatively have a variety of shapes: for example, the actuator assembly could be rectangular or oblong, or shaped like an arrow.

The heads 146 (FIG. 1B) read and/or write data to the disks. Each side of a disk 120 can have an associated head 146, and the heads 146 are collectively coupled to the actuator assembly 130 such that the heads 146 pivot in unison. When not in use, the heads 146 can rest on the stationary disk 120 (typically on an inner portion of the disk that does not contain data) or on a ramp 150 positioned either adjacent to a disk or just over the disk surface.

FIG. 1B details a subassembly commonly referred to as ahead suspension assembly (HSA) 140, comprising the head 146 attached to a slider 144, which is further attached to a flexible suspension member (a suspension) 142. The spinning of the disk 120 creates airpressure beneath the slider 144 that lifts the slider 144 and consequently the head 146 off of the surface of the disk 120, creating a micro-gap of typically less than four micro-inches between the disk 120 and the head 146 in one embodiment. The suspension 142 is bent or shaped to act as a spring such that a load force is applied to the surface of the disk. The "air bearing" created by the spinning of the disk 120 resists the spring force applied by the suspension 142, and the opposition of the spring force and the air bearing to one another allows the head 146 to trace the surface contour of the rotating disk surface, which is likely to have minute warpage, without "crashing" against the disk surface. When ahead "crashes", the head collides with a surface such that the head is damaged.

Figure 2:
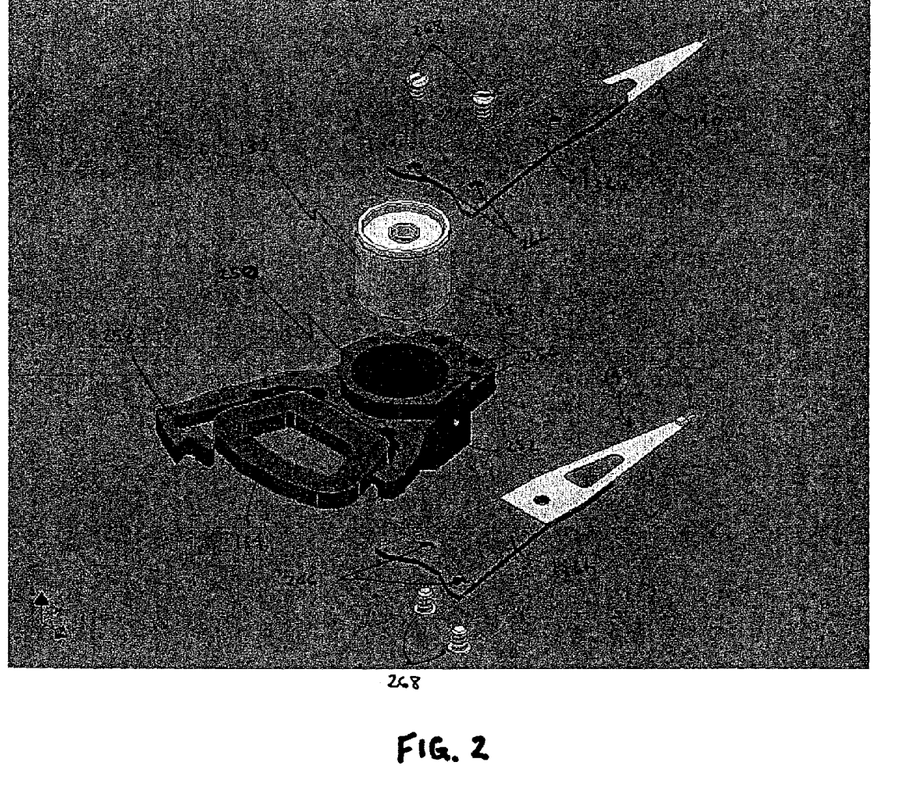
FIG. 2 is an exploded view of an actuator assembly in accordance with one embodiment of the invention.

The HSA 140 is connected to the actuator assembly by a rigid arm 136. As described above, the suspension 142 is typically swaged to the rigid arm, or micro-spot welded to an arm plate which forms part of the bearing assembly bore. FIG. 2 is an exploded view of one embodiment of the actuator assembly 130 contemplated in the present invention. The actuator assembly 130 comprises a mounting block 250 having a solid bore 252 for receiving a bearing assembly 132. A spacer 254 is formed at a first end of the mounting block 250 (by casting, extruding or milling, for example). The spacer 254 is at least as thick as a disk 120 and has at least one, and preferably four threaded holes 256 extending through the width of the spacer 254 for engaging the threads of screws 268. In alternative embodiments one or more threaded holes 256 through the top and bottom of the spacer only partially penetrate the spacer. In still other embodiments the spacer holes 256 are not threaded, but smooth for receipt of bolts or other fasteners. A voice coil holder 258 is mounted at a second end of the mounting block 250, and retains a voice coil 134. The voice coil holder 258 can be cast as part of a singular block element with the mounting block 250, adhesively bonded or plastic over-molded onto the mounting block 250, or alternatively welded or soldered to the mounting block 250. One of ordinary skill in the art can appreciate the different methods for fastening the voice coil holder 258 to the mounting block 250.

Providing a solid bore 252 simplifies the cleaning process and allows flexibility in choosing the technique for journaling pivot bearings. The bearing assembly 132 can be comprised of a separate cartridge bearing which can be installed after head stack assembly cleaning, or alternatively can include discrete bearings positioned in the actuator bore 252.

As indicated above, the HSA 140 is connected with the actuator assembly 130 by an arm 136. The arm 136 can be stamped or milled and made from stainless steel, aluminum, magnesium, titanium or other suitable material. The arm 136 includes at least one, but preferably two holes 266 at the distal end for receiving screws 268. In FIG. 2, the two holes 266 are shown offset so that the holes of a first arm 136a mounted to the top surface of the spacer 254 and the holes of a second arm 136b mounted to the bottom surface of the spacer 254 are aligned with different threaded holes 256 in the spacer. This arrangement prevents screws 268 which engage the threaded holes 256 from opposite surfaces of the spacer 254 from interfering with one another. This arrangement also allows an arm to cover threaded holes 256 which are not aligned with holes 266 in the arm 136 to reduce foreign material entering the threaded holes 256. In one embodiment, the suspensions 142 are micro-spot welded to the proximal end of the arm 136. In other embodiments, the suspensions 142 can be adhesively bonded to the arm 136. In still other embodiments the suspensions 142 and the respective arms 136*a*/136*b* comprise single stamped pieces.

As indicated above, first arm 136*a* is removably fastened to the top surface of the spacer 254 by at least one, and preferably two screws 268 such that the suspension applies a load force against the top surface of a disk 120 mounted in the plane of the spacer 254. Also as indicated above, the second arm 136*b* is removably fastened to the bottom surface of the spacer 254 by at least one, and preferably two screws 268 such that the suspension applies a load force against the bottom surface of the disk 120. Thus, the disk 120 is positioned between the top and bottom arm 136*a* and 136*b*. In other embodiments, the arms 136 are removably fastened to the spacer 254 using bolts. In still other embodiments, the arms 136 are removably fastened to the spacer 254 using pressure fittings. One of ordinary skill in the art can appreciate the different means for attaching the arms 136 to the spacer 254. Actuator assemblies in accordance with embodiments of the present invention can be built at a relatively low cost and without the misalignment and deformation associated with the prior art assemblies. Further, arms 136 having different thicknesses or shapes can be easily substituted, thus allowing tuning of resonant frequencies according to the needs of the product while minimizing additional manufacturing costs. These needs maybe dictated by spindle speed, shock and vibration performance requirements or other parameters.

The invention described herein is equally applicable to technologies using other read/write devices, for example lasers. In such an alternative embodiment, the HSA 140 would be substituted with an alternative read/write device, for example a laser, which could be either removably or fixedly attached to an arm 136, in a similar manner as described above (micro-spot welding, adhesives, single-piece stamping). The arm 136 is subsequently removably fastened to mounting block 250 in the manner described above.

Figure 3:
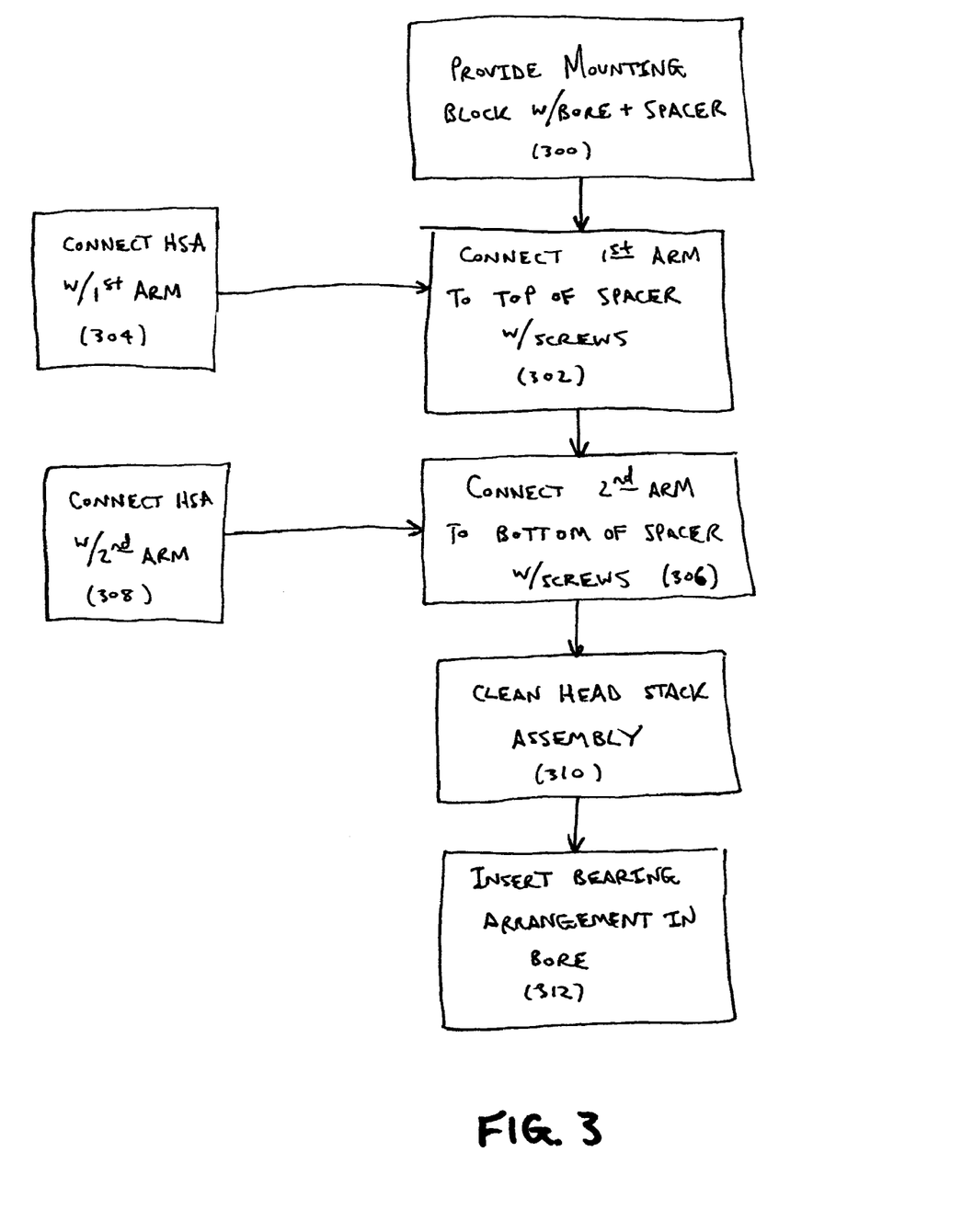
FIG. 3 is a block diagram of a method for manufacturing an actuator assembly in accordance with one embodiment of the invention.

FIG. 3 is a representation of a method for manufacturing the actuator assembly represented in FIG. 2 As shown as the first step 300, a mounting block 250 is provided, the mounting block having a central, cylindrical bore 252. Further, the mounting block has a spacer 254 at a first end for attaching arms 136 and a voice coil holder 258 at a second end that retains a voice coil. A first pre-assembled HSA 140 is micro-spot welded, or alternately adhesively fastened, to a first arm 136*a* (step 304)and similarly a second pre-assembled HSA 140 is micro-spot welded to a second arm 136*b* (step 308). In other embodiments, an arm and a suspension can be stamped as a single piece, wherein a head connected with a slider could be mounted to each arm/suspension prior to connecting each arm/suspension to the mounting block.

The first arm 136*a* is removably fastened to the top surface of the spacer (step 302) and the second arm 136*b* is removably fastened to the bottom surface of the spacer (step 306). The completed assembly, known as the head stack assembly, can then be cleaned (step 310) prior to mounting the bearing assembly 132. The heads stack assembly is then mounted onto the bearing assembly 132 (step 312) such that the head stack assembly rotates freely about the bearing assembly. As described in regards to FIGS. 1A and 2, the bearing assembly 132 can comprise a cartridge bearing, or discrete bearings solidly attached in the actuator bore section. In other embodiment at least some of the HSAs can be mounted to the mounting block after the mounting block is positioned onto the bearing assembly.

Figure 4:
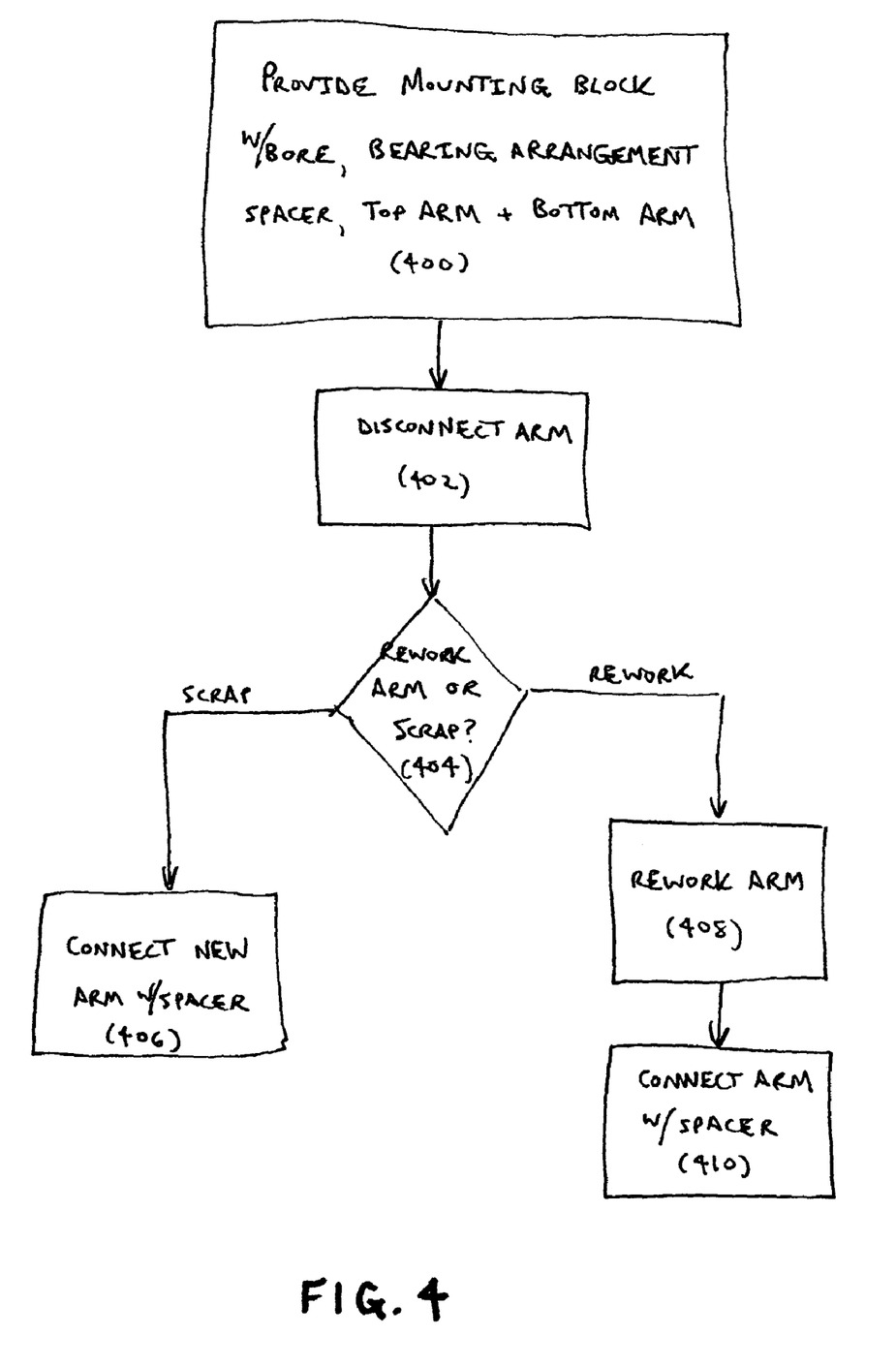
FIG. 4 is a block diagram of a method for reworking an actuator assembly in accordance with one embodiment of the invention.

FIG. 4 is a representation of a method for reworking an actuator assembly represented in FIG. 2. If the actuator assembly 130 is mounted within hard disk drive 100 (step 400), the actuator assembly is removed from the hard disk drive 100. The arm requiring rework (step 402) is unfastened from the actuator assembly. The arm is then either replaced with a substitute HSA (steps 404,406) connected with an arm or the unfastened HSA connected with an arm is repaired (steps 404,408), and the arm is subsequently reattached to the actuator assembly 130 (step 410). The method represented in FIG. 4 provides the significant advantage of fast rework without removing the bearing assembly 132.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. An assembly to access a data storage medium, the assembly comprising:
    a mounting block adapted to pivot, the mounting block including a bore;
    a bearing assembly associated with the bore such that a journal of the bearing assembly is disposed within the bore;
    a spacer extending from the mounting block having a plurality of holes accessible from one or both of a top surface and a bottom surface of the spacer in order to receive one or more removable fasteners;
    a first rigid arm disposed over one of the top surface and the bottom surface and removably fastened with the spacer;
    a second rigid arm disposed over the other of the top surface and the bottom surface and removably fastened with the spacer; and
    wherein the first rigid arm and the second rigid arm are separately removably fastened with the spacer such that one of the first rigid arm and the second rigid arm is adapted to remain fastened with the spacer when the other of the first rigid arm and the second rigid arm is removed.

2. The assembly of claim 1, wherein the the first rigid arm and the second rigid arm are removably fastened with the spacer by screws.

3. The assembly of claim 1, wherein the bearing arrangement is a bearing cartridge.

4. The assembly of claim 1, wherein one or both of the first rigid arm and the second rigid arm comprise a metal selected from the group consisting of stainless steel, aluminum, titanium, and magnesium.

5. The actuator assembly of claim 1, wherein:
    the plurality of holes are accessible from both of the top surface and the bottom surface of the spacer;

a first set from the plurality of holes is associated with the first rigid arm;

a second set from the plurality of holes is associated with the second rigid arm;

when the first rigid arm is removably fastened with one of the top surface and the bottom surface, the second set is inaccessible from the one of the top surface and the bottom surface; and when the second rigid arm is removably fastened with one of the top surface and the bottom surface, the first set is inaccessible from the one of the top surface and the bottom surface.

6. An actuator assembly to access a data storage medium, the actuator assembly comprising:

a mounting block including a bore adapted to receive a bearing assembly, the bore having a dimension such that a journal of the bearing assembly is disposed within the bore;

a spacer extending from the mounting block having a plurality of holes accessible from one or both of a top surface and a bottom surface of the spacer in order to receive one or more removable fasteners;

a first rigid arm disposed over one of the top surface and the bottom surface and removably fastened with the spacer a second rigid arm disposed over the other of the top surface and the bottom surface and removably fastened with the spacer; and wherein the first rigid arm and the second rigid arm are separately removably fastened with the spacer such that one of the first rigid arm and the second rigid arm is adapted to remain fastened with the spacer when the other of the first rigid arm and the second rigid arm is removed.

7. The actuator assembly of claim 6, wherein:

the plurality of holes are accessible from both of the top surface and the bottom surface of the spacer;

a first set from the plurality of holes is associated with the first rigid arm;

a second set from the plurality of holes is associated with the second rigid arm;

when the first rigid arm is removably fastened with one of the top surface and the bottom surface, the second set is inaccessible from the one of the top surface and the bottom surface; and when the second rigid arm is removably fastened with one of the top surface and the bottom surface, the first set is inaccessible from the one of the top surface and the bottom surface.

* * * * *

UNITED STATES PATENT AND TRADEMARK OFFICE
CERTIFICATE OF CORRECTION

| | | |
|---|---|---|
| PATENT NO. | : 6,989,970 B2 | Page 1 of 8 |
| APPLICATION NO. | : 10/365932 | |
| DATED | : January 24, 2006 | |
| INVENTOR(S) | : Christopher Nguyen et al. | |

It is certified that error appears in the above-identified patent and that said Letters Patent is hereby corrected as shown below:

The title page, showing an illustrative figure, should be deleted and substitute therefor the attached title page.

Delete Drawing sheet(s) 1-5, and substitute therefor the Drawing sheet(s) consisting of FIGS. 1A-4 as shown on the attached pages.

Signed and Sealed this

Second Day of October, 2007

JON W. DUDAS
*Director of the United States Patent and Trademark Office*

United States Patent
Nguyen et al.

(10) Patent No.: US 6,989,970 B2
(45) Date of Patent: Jan. 24, 2006

(54) ROTARY ACTUATOR ASSEMBLY FOR A ROTATABLE MEDIA DATA STORAGE DEVICE

(75) Inventors: Christopher Nguyen, Union City, CA (US); Joseph T. Castagna, San Jose, CA (US); Richard G. Ramsdell, Saratoga, CA (US)

(73) Assignee: Matsushita Electric Industrial Co., Ltd., Kadoma (JP)

(*) Notice: Subject to any disclaimer, the term of this patent is extended or adjusted under 35 U.S.C. 154(b) by 146 days.

(21) Appl. No.: 10/365,932

(22) Filed: Feb. 13, 2003

(65) Prior Publication Data
US 2004/0125505 A1 Jul. 1, 2004

Related U.S. Application Data

(60) Provisional application No. 60/436,741, filed on Dec. 27, 2002.

(51) Int. Cl.
G11B 21/08 (2006.01)
(52) U.S. Cl. .................................. 360/265.7
(58) Field of Classification Search .......... 360/265.7, 360/244.5, 244–6, 265.9, 99.08; 29/603.03
See application file for complete search history.

(56) References Cited

U.S. PATENT DOCUMENTS

| | | | |
|---|---|---|---|
| 4,860,135 A | 8/1989 | Cain | 360/97.02 |
| 4,912,583 A * | 3/1990 | Hinlein | 360/244.5 |
| 4,942,491 A | 7/1990 | Osawa et al. | 360/265.9 |
| 4,994,931 A | 2/1991 | Foote | 365/106 |
| 5,034,837 A | 7/1991 | Schmitz | |
| 5,040,086 A | 8/1991 | Hibino | 360/264.1 |
| 5,099,373 A | 3/1992 | Shibata et al. | 360/265.9 |
| 5,109,310 A | 4/1992 | Ohkjita et al. | 360/264.3 |
| 5,119,537 A | 6/1992 | Hamanaka et al. | 29/603.03 |
| 5,184,265 A * | 2/1993 | Foote et al. | 360/265.9 |
| 5,235,482 A | 8/1993 | Schmitz | 360/97.02 |
| 5,382,851 A | 1/1995 | Loubier | 310/13 |

(Continued)

FOREIGN PATENT DOCUMENTS

FR  744482 A2 * 11/1996

(Continued)

OTHER PUBLICATIONS

"A novel suspension arm with 2-dimensional actuation, for flying height control and high-bandwidth track following in advanced hard disk drives"; Chilumbu, C.; Clegg, W.; Jenkins, D.; Robinson, P.; May 1-4, 2000; pp.: 562-566.

*Primary Examiner*—Allen Cao
(74) *Attorney, Agent, or Firm*—Flicsler Meyer LLP (57) ABSTRACT

Assemblies in accordance with the present invention can access a data storage medium having one or more disks. One such assembly comprises a mounting block including a bore and at least one arm connected with the mounting block. A flexible member is connected with the at least one arm and a head is associated with the flexible member. The head is positioned over the surface of the disk. The arm is designed such that it can be disconnected from the mount without disassembling the bore. By having a removably fastened arm, the assembly can be built at a relatively low cost and without misalignment and deformation. This description is not intended to be a complete description of, or limit the scope of, the invention. Other features, aspects, and objects of the invention can be obtained from a review of the specification, the figures, and the claims.

7 Claims, 5 Drawing Sheets

Fig. 2

DRAWINGS

*Fig. 1A*

DRAWINGS

Fig. 1B

DRAWINGS

Fig. 1C

DRAWINGS

Fig. 2

DRAWINGS

Fig. 3

DRAWINGS

Fig. 4